Nov. 27, 1951   R. D. PARRY   2,576,237
FISHING FLOAT
Filed July 23, 1948
Fig. 2.  Fig. 1.  Fig. 3.
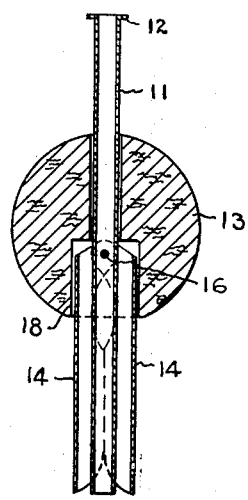
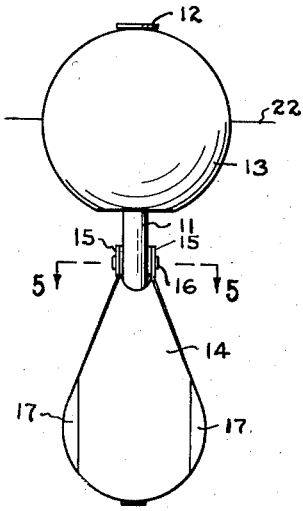
Fig. 4.
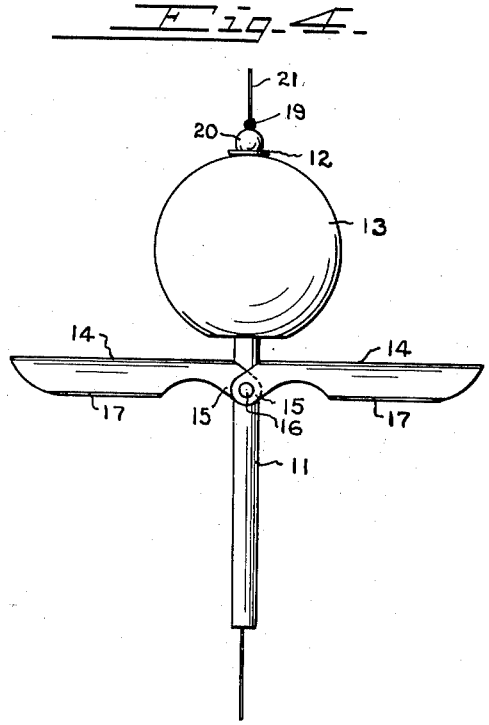
Fig. 5.
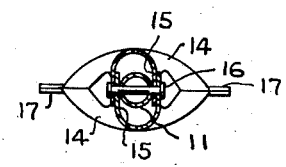
INVENTOR.
ROBERT D. PARRY.
BY
ATTORNEY.

Patented Nov. 27, 1951

2,576,237

UNITED STATES PATENT OFFICE 2,576,237

FISHING FLOAT

Robert D. Parry, Cincinnati, Ohio

Application July 23, 1948, Serial No. 40,229

2 Claims. (Cl. 43—44.91)

This invention relates to a fishing float of the slip cork type having novel means for permitting casting of the float and having means for setting the hook when a fish starts to run with the bait.

The object of my invention is to provide a fishing float with a pair of wing members normally resting against the stem of the float except when the float is pulled under the water by the action of the fish attempting to run with the bait, at which time the wing members assume a horizontal position to retard further movement of the bait thereby setting the hook.

A further object is to provide a sliding cork or float on the stem arranged to hold the wing members against the stem during casting operation, but which will move away from the wing members when the float is in the water.

My invention will be further readily understood from the following description and claims and from the drawings, in which latter:

Fig. 1 is a plan view of my improved device.

Fig. 2 is a vertical section of the same, taken in the plane of the line 2—2 of Fig. 1, showing the float in casting position.

Fig. 3 is a side view of the same in floating position.

Fig. 4 is a front view of the same in fighting position.

Fig. 5 is a detail section, taken in the plane of the line 5—5 of Fig. 3.

My improved float comprises a tubular stem 11 having a flared upper end 12. A floatable member 13 is received on the stem and is freely slidable thereon and retained by the flared upper end of the stem. A pair of wing members 14 having extensions 15 are arranged to be overlapped and pivoted to the stem as by a rivet 16. The wing members are concave with the outer edges flat as indicated at 17 to permit the wing members to rest along the stem in a vertical position. The lower portion of the float member has an enlarged recess 18 which drops over the wing members when the float is in casting position, and holds the wings against the stem during the cast.

A suitable obstruction 19 is formed in the line for the desired depth of fishing and a bead 20 of sufficient size to form a stop for the float is threaded on the line 21. The line is then threaded through the tubular stem and the sinker and hook are attached to the end of the line.

In casting the float, the entire unit slides down the line to the sinker and the floatable member 13 engages the upper ends of the wings holding them in place against the stem to permit maximum casting distance. When the float strikes the water the sinker pulls the line down until the bead on the line rests against the obstruction and resists further movement of line. The floatable member rises on the stem contacting the flared upper end of the stem leaving the wings free. This position is shown in Fig. 3 with the water line indicated at 22.

When a fish takes the bait and attempts to run with it, the float is pulled under and after a few inches of movement the wings open to the position shown in Fig. 4 forming a resistance on the line which sets the hook. If the fish relaxes his pull the wing collapse, upon repeated pulls they open, thus fighting the fish until he is exhausted sufficiently to be pulled in.

Having thus fully described my invention, what I claim as new and desire to secure by Letters Patent, is:

1. A fishing float comprising a stem, a floatable member slidable on said stem and provided with a recess in the surface thereof surrounding said stem, a pair of wings, and a pivot on the stem for pivotally supporting the wings below the floating member in one position of the stem relative to the floating member to provide delayed resistance to said float, and said pivot for the wings being located within the recess when the wings are in collapsed condition and partially located within the recess.

2. A fishing float comprising a stem, a floatable member slidable on said stem and provided with a recess in the surface thereof surrounding said stem, means on the upper end of said stem for limiting the movement of said stem with respect to said floatable member, a pair of wings, and a pivot on the stem for pivotally supporting the wings below the floating member in one position of the stem relative to the floating member to provide delayed resistance to said float, and said pivot for the wings being located within the recess when the wings are in collapsed condition and partially located within the recess.

ROBERT D. PARRY.

REFERENCES CITED

The following references are of record in the file of this patent:

UNITED STATES PATENTS

| Number | Name | Date |
|---|---|---|
| 2,153,339 | Reeves et al. | Apr. 4, 1939 |
| 2,208,240 | Arensen et al. | July 16, 1940 |
| 2,234,243 | Goertzen | Mar. 11, 1941 |
| 2,237,194 | Ohnmacht | Apr. 1, 1941 |